Figure 3:
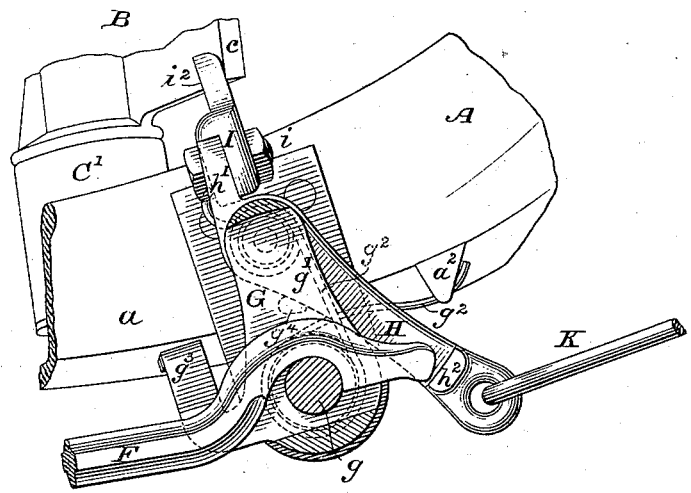

(No Model.) 2 Sheets—Sheet 1.
H. E. PRIDMORE.
HARVESTER RAKE.
No. 307,067. Patented Oct. 21, 1884.
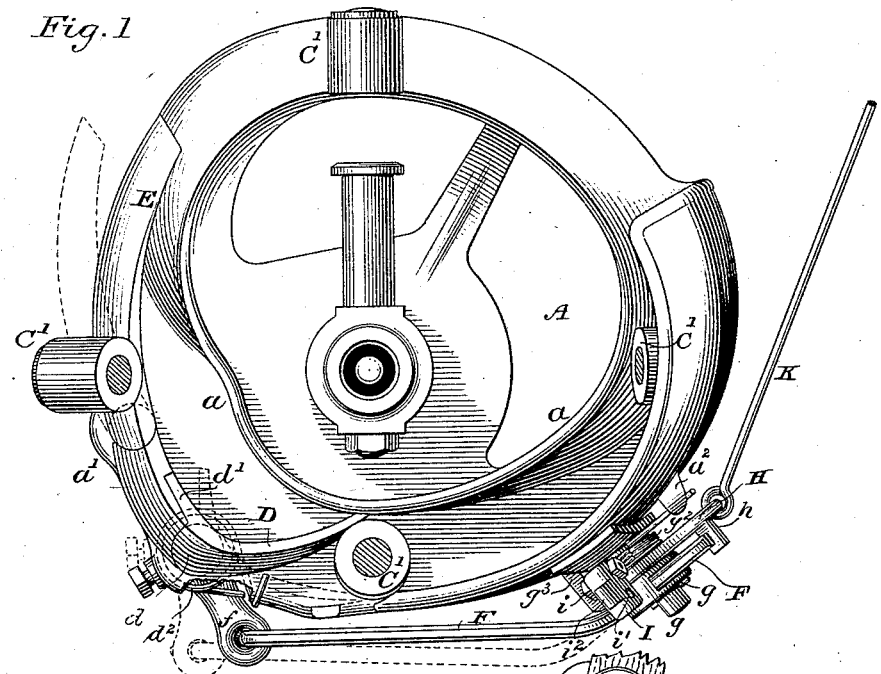
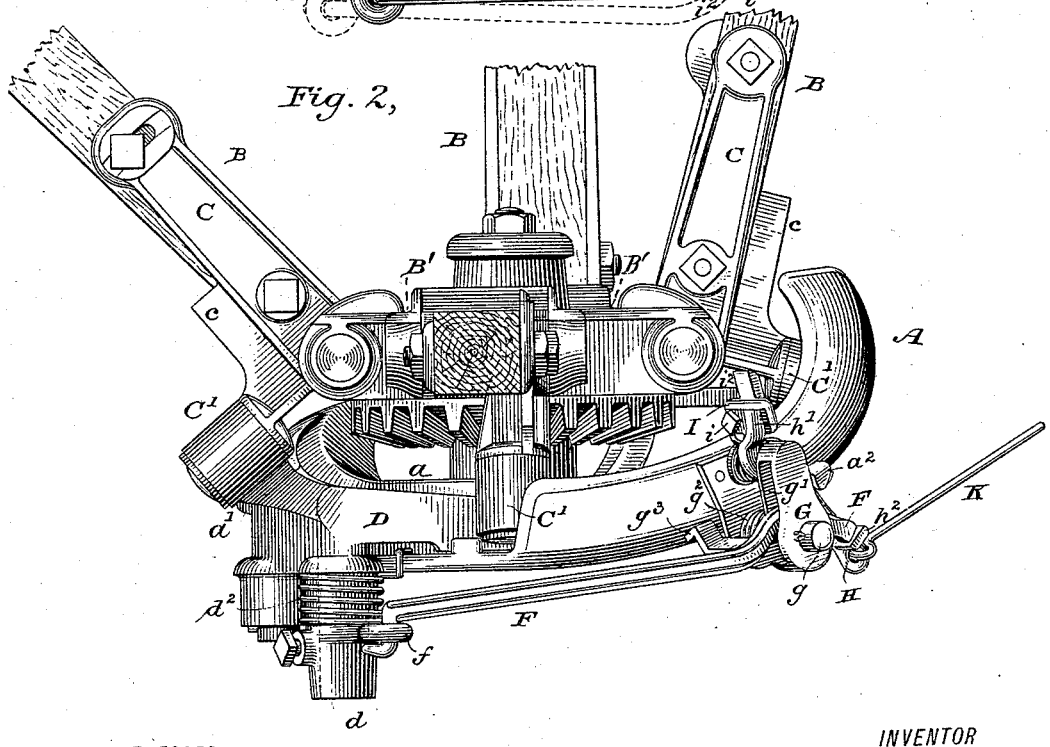
WITNESSES
Wm A. Skinkle
Geo W. Breck
INVENTOR
Henry E. Pridmore
By his Attorneys
Pancurser & ed Pancurser (No Model.) 2 Sheets—Sheet 2.

H. E. PRIDMORE.
HARVESTER RAKE.

No. 307,067. Patented Oct. 21, 1884.

WITNESSES
Wm A. Skinkle.
Geo. W. Buck

INVENTOR
Henry E. Pridmore
By his Attorneys
Poncausen &co Poncauson

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

HARVESTER-RAKE.

SPECIFICATION forming part of Letters Patent No. 307,067, dated October 21, 1884.

Application filed March 2, 1883. (No model.) Patented in Canada April 7, 1884, No. 19,092.

*To all whom it may concern:*

Be it known that I, HENRY E. PRIDMORE, of Chicago, in the county of Cook and State of Illinois, have invented certain new and useful Improvements in Harvester-Rakes, of which the following is a specification.

My invention relates to that class of rakes known as "sweep-rakes," in which the path of the rake-arm is controlled by a cam, and changed from an inner to an outer track thereon by means of a switch, to cause the rake-blade to sweep the platform, or to rise thereabove after fulfilling its function as a reel, to discharge the accumulated gavel, or to allow time for it to gather of full size when the crop is thin; and it has for its object to cause the switch to be automatically controlled by the rake-arms in their passage, so that any desired number of the rakes may be made to sweep the platform, and also to enable the attendant at will to prevent said arms from operating the switch.

To this end it consists in combining with a switch or gate normally pressed open by a spring to leave the inner track free, that the rakes may sweep the platform, a latch which holds it positively closed against the stress of said spring, a jointed trip-lever actuated by tappets on the rake-arms to release said latch, and means whereby the upper member of said lever may be rocked upon its pivotal connection with the other to remove it from the effective path of said arms; in combining with the switch or gate and the gate-latch which holds it positively closed against the stress of its spring a lever-arm to release said gate-latch, a laterally-adjustable stop on the free end of said lever, and tappets of varying length on the successive rake-arms, whereby the lever may be arranged to be operated by any one or more of said rake-arms by adjusting said stop; in combining with the gate-latch which holds the switch or gate positively closed against the stress of its controlling-spring a jointed lever adapted to be rocked by tappets on the rake-arms as they pass, and a connection between one member of said lever and a lever or treadle under control of the driver or attendant, whereby said member may be swung out of the path of the tappets on the rake-arms, that the latch may not be released by them, and in the various other combinations and details of construction hereinafter described and claimed.

Figure 5:
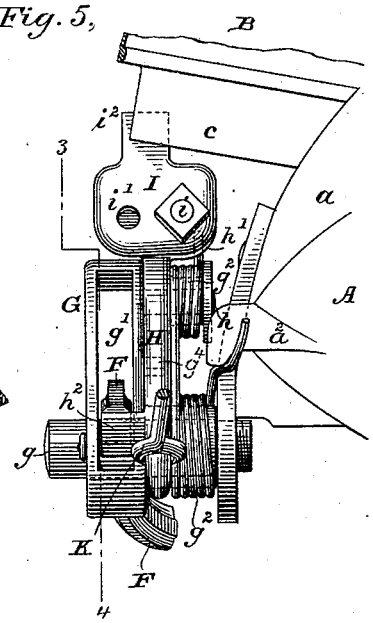
Figure 4:
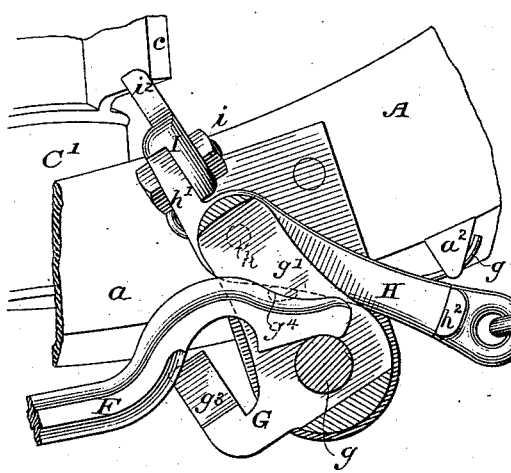

In the drawings, Figure 1 is a plan view of a rake-cam embodying my invention, the rake-arms being removed, but the rollers being shown. Fig. 2 is a side elevation thereof with the rake-arms shown in position. Figs. 3, 4, and 5 are details representing the mode in which the rake-arm trips the latch, and Fig. 6 a detail view to indicate the manner in which the attendant prevents the latch from being tripped.

A is a rake head or cam of the usual outline—such as in the Johnston harvesters of the present day—having at one point an inner track, $a$, and an outer track, $a'$, suitably arranged to guide the rake-blades through a platform-sweeping or grain-reeling path, according as their rollers travel one or the other.

B are rake-arms pivoted to a revolving head or crown, B', and having metal shanks or elbows C, with rollers C' upon the heel-extension thereof to take into and follow the cam-track. Cast with each of these rake-elbows or one member thereof is a tappet, $c$, in effect a flange longitudinally of the rake-arm, and varying in length upon the successive arms, either or all of these tappets differing in length so that a single rake out of the series may be caused to sweep the platform, as will hereinafter appear, or else two or more of the rakes equidistant from each other being supplied with tappets of the same length, while the tappets on the others are of different lengths. A gate, D, upon a vertical pivot, $d$, is arranged to change the rollers from the inner to the outer track in the well-known manner, a heel-extension, $d'$, from this gate being thrown across the inner track into the path of the rake-roller when said rake is open, so that as the roller passes it may force it shut, and a spring. $d^2$, encircles its pivot-pin and bears in such manner that it tends to hold it normally open, so that whenever it is closed and is released from the instrumentality which holds it closed it will fly open. The usual bridge, E, is arranged at the other end of the double track, swinging upon a vertical or nearly vertical pivot and held normally closed by a spring, that it may yield to the passage of any rake-roller following the inner track, or may support and guide rollers which are traveling upon the outer track, thus forming itself a continuation of said outer track. From the pivot of the switch or gate projects a lateral lug, $f$, in which is hooked one end of the gate-latch F, consisting of a rod bent and recessed at its other end, as shown, to catch over a pin, $g$, projecting from the rake or cam. This pin affords a pivot for a swinging piece or casting, G, preferably slotted, as at $g'$, to receive and serve as a keeper for the end of the latch, and forming the lower section of the jointed trip-lever, as will presently appear. A spring, $g^2$, coiled upon the pivot-pin and seated at one end against a lug or projection, $a^2$, on the cam and at the other end against the casting, holds the latter normally in the position represented in Fig. 3, a stop, $g^3$, on said casting striking the body of the cam and preventing it from being swung beyond this position by the force of the spring. Pivoted to the upper end of the casting by means of a pin, $h$, and serving as the second section of the jointed trip-lever, is a lever-arm, H, kept normally nearly parallel with said casting by the action of the spring $g^2$, which, as indicated in Fig. 5, is prolonged and coiled upon the second pivot, $h$, whereby it is afforded its above-mentioned seat against the casting, and at the end of this latter coil is finally seated against the lever-arm H. A single spring is thus made to hold the casting in position with its stop resting against the rake-head, and at the same time to keep the lever-arm alongside said casting, it being prevented from passing the latter by striking against a stop, $g^4$, thereon, or against the lower pivot-pin or its spring. The extreme upper end of the lever-arm has a lateral flattening or enlargement, $h'$, to which is clamped a hardened metal plate, I, by means of a bolt, $i$, said plate having a suitable seat formed thereon to take over and embrace the head or enlargement of the lever sufficiently to enable the plate to be held steadily in position by a single bolt, although more than one bolt may be employed, if desired, or other means adopted to keep the plate from swinging or playing upon said single bolt. A number of bolt-holes, $i'$, are drilled through the plate in order that it may be adjusted laterally to bring a projection or finger, $i^2$, which it carries in the path of any desired number of the tappets on the rake-arms. At the lower end of the lever-arm is a lateral lug or projection, $h^2$, which comes underneath the extreme end of the gate-latch just beyond the catch or recess therein that hooks over the lower pivot-pin. When, therefore, a tappet comes in contact with the finger at the upper end of the lever-arm, it will swing both arm and casting upon the lower pivot, the stress of the spring upon the upper pivot and the advantage it has in leverage over the coil on the lower pivot being sufficient to cause the arm and casting to move together as if composed of a single integral piece. This brings the lug at the lower end of the lever-arm against the end of the gate-latch and raises the latter until it is released from the pivot-pin, when the gate is forced open by its spring carrying the latch forward slightly, but leaving its end still retained in the keeper or slotted guideway in the casting, as shown in Fig. 4. The roller upon that rake-arm which has tripped the catch now enters the inner track, and as it passes beyond the gate-pivot strikes against the re-entrant heel-arm of said gate and forces it shut, carrying the latch back to place and locking the gate in its closed position, so that the next rake-roller, unless the tappet on its arm should be of sufficient length to strike the tripping device, will travel on the outer track.

Figure 6:
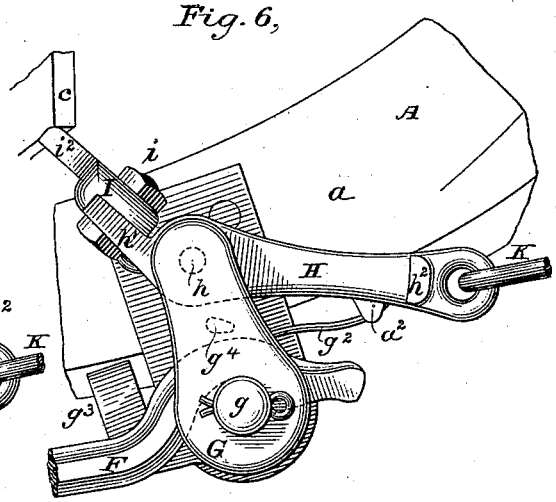

In order, at the will of the operator or driver, to prevent the tripping of the gate-latch in case the crop should be so thin that a sufficient gavel fails to collect in the time permitted by the adjustment of the tripping mechanism, a link, K, is attached to the lower end of the lever-arm, connecting with a treadle or hand-lever in position to be controlled by said operator. By means of this link the lever-arm can be swung on its pivot to carry its lug out from beneath the end of the gate-latch, as indicated in Fig. 6, thus springing its upper end down out of the reach of any tappet on the rake arm or arms and leaving the latch undisturbed, while successive rakes act as reel-beaters until the gavel is of the proper size, when the lever-arm, being released, will spring back to place, and the next tappet of the proper length will trip the latch.

It is evident that the adjustable plate at the top of the jointed trip-lever may be omitted and the device successfully worked in connection with separately-adjustable tappets, although these latter would require closer attention to be given by the driver to the condition of the crop, and in so far are not as desirable. It is to be understood, also, that the particular form of cam and arrangement of gate and bridge are not essential to the effective working of the tripping device proper, there being other well-known forms to which it can be readily applied, and this being referred to only by way of illustration and as presumed to be the best.

The combination, broadly, of the trip-lever, a catch pivoted thereto for the purpose of engagement with the trip-latch, and a single spring serving to hold said lever and catch at once in their normal position for effective action, has been made the subject of a claim in an application filed by me on the 3d day of March, 1883, Serial No. 86,969, and is therefore not intended to be covered herein.

I claim—

1. The combination, substantially as hereinbefore set forth, with the gate-latch which holds the switch or gate positively closed against the stress of its controlling-spring, of a jointed trip-lever adapted to be rocked upon its main pivot by the tappets on the rake-arms as they pass to release said latch, and a connection between one member of said lever and a hand-lever or treadle under control of the driver or attendant, whereby said member may be swung out of the path of the tappets on the rake-arms, that the latch may not be released by them.

2. The combination, substantially as hereinbefore set forth, of a switch or gate, a gate-latch which holds it positively closed against the stress of its spring, a jointed trip-lever actuated by tappets on the rake-arms to release said latch, and means whereby the upper member of said lever may be rocked upon its pivotal connection with the other, to remove it from the effective path of said arms.

3. The combination, substantially as hereinbefore set forth, of the switch or gate, the gate-latch which holds it positively closed against the stress of its spring, a lever-arm to release said gate-latch, a laterally-adjustable stop on the free end of said lever, and tappets of varying lateral length on the successive rake-arms, whereby the lever may be arranged to be operated by any one or more of said rake-arms by adjusting the stop.

4. The combination, substantially as hereinbefore set forth. with the gate-latch, of the slotted casting pivoted to the pin over which the latch takes and serving as a keeper or guide for its free end, and the lever-arm pivoted to the top of said casting, with its upper end arranged to be actuated by tappets on the rake-arms, and its lower end provided with a lug which comes beneath the end of the gate-latch to release it as said lever-arm is moved by the tappets.

5. The combination, substantially as hereinbefore set forth, with the gate-latch, of the slotted casting pivoted to the pin over which the latch takes, to serve as a keeper to its free end, a spring acting upon said casting to hold it in a normally vertical position, and an arm pivoted to the upper end of said casting and held normally alongside thereof by spring-pressure, and having its upper end projected into the path of tappets on the rake-arms and its lower end provided with a lug which comes beneath the end of the gate-latch, whereby said arm and casting will be moved bodily together on the pivot of the casting by the contact of a tappet upon a passing rake with the upper end of said arm, and the gate-latch will be lifted and released.

6. The combination, substantially as hereinbefore set forth, with the gate-latch, of the slotted casting moving pivotally upon the pin over which said latch takes, the lever-arm pivoted to the upper end of said casting, and the spring coiled about the pivot of the casting, with one end seated against the rake-cam, and its other end extended and coiled about the lever-arm pivot, and finally bearing against the upper end of said lever-arm, whereby the casting is held in a normally vertical position with the lever-arm alongside thereof, and the two will be moved together, as if one piece, by the contact of a tappet on a passing rake with the upper end of the lever-arm.

7. The combination, substantially as hereinbefore set forth, with the gate-latch, of the slotted casting pivoted to the pin over which said latch takes, the stop on said casting to bear against the rake-cam, the lever-arm pivoted to the upper end of the casting, and stopped by a projection thereover, with a lug at its lower end extending beneath the end of the gate-latch, and the spring which normally holds these parts in position determined by their respective stops.

8. The combination, substantially as hereinbefore set forth, with the gate-latch, of the slotted casting pivoted to the pin over which said latch takes, and forming a keeper for its free end, the lever-arm pivoted to the upper end of said casting and projecting thereabove into the path of the tappets upon the rake-arms, the lug on said lever to disengage the gate-latch, the spring holding said casting and lever in a normally upright position—one alongside the other in position for action—and the link or equivalent connection, with mechanism controlled by the driver, whereby the lever-arm can be rocked upon its pivot without disturbing the casting, to throw its free end out of the effective path of the tappets on the rake-arms.

9. The combination, with the gate-latch, of the casting pivoted to the pin over which said latch takes, the lever-arm pivoted to the upper end of said casting, projecting thereabove into position to be operated upon by tappets on the rake-arms in their passage, the lug on the lower end of said lever-arm coming beneath the end of the gate-latch, stops for said casting and lever-arm, and a single spring holding them together—one alongside of the other—in operative position determined by their respective stops, so that they may move as one when the lever-arm is pushed by a rake-arm.

HENRY E. PRIDMORE.

Witnesses:
JOHN V. A. HASBROOK,
W. J. DUNN.